Patented May 22, 1928.

1,670,969

UNITED STATES PATENT OFFICE.

OSCAR KNECHT, OF BINNINGEN, NEAR BASEL, SWITZERLAND, ASSIGNOR TO THE FIRM CHEMICAL WORKS FORMERLY SANDOZ, OF BASEL, SWITZERLAND.

2-AMINO-4-NITROPHENOXYPROPANDIOL AND PROCESS OF PRODUCING SAME.

No Drawing. Original application filed December 13, 1926, Serial No. 154,652, and in Germany December 19, 1925. Divided and this application filed October 27, 1927. Serial No. 229,275.

This application is divisional of application Ser. No. 154,652, filed December 13, 1926.

2.4-dinitrophenoxypropandiol is, contrarily to the 2.4-dinitrophenolalkylethers, easily hydrolyzed by alkaline agents, as for instance by dilute caustic soda. This splitting off of the glycerol radical, which happens very easily, is the reason why the preparation of this compound, after known prescriptions, could hitherto only be performed in an imperfect manner. It was, therefore, not to be foreseen, whether it would be possible to transform the 2.4-dinitrophenoxypropandiol into the hitherto unknown nitroamino compound by means of alkaline reducing agents.

It has now been found that this is possible and almost without saponification, if 2.4-dinitrophenoxypropandiol is treated with alkali sulphides or alkali polysulphides at warm temperature. By an easy reaction and without by-products, 2-amino-4-nitrophenoxypropandiol is formed, which is more difficultly saponifiable than the dinitrocompound. This derivative of m-nitraniline, which so far as known has never been prepared, may be used as intermediate product for the preparation of valuable dyestuffs.

The following example illustrates the process:

To an aqueous suspension of 200 kg of 2.4-dinitrophenoxypropandiol (Berliner Berichte 12, 766; Journ. Chem. Soc. London, 119, 1035) an aqueous solution of sodium tetrasulfide, prepared from 240 kg of sodium sulphide and 96 kg of sulphur, is added, under vigorous stirring at about 60° C., whereby an immediate reduction takes place under self heating. The mixture is kept a short time at a temperature of 60° C., then cooled down to 20° C. After neutralization with 25 kg of hydrochloric acid the nitroaminocompound is precipitated as an orange colored deposit containing sulphur. The nitroaminocompound is then dissolved in 500 litres of water and 80 kg of hydrochloric acid, the sulphur remaining undissolved. The hydrochloride solution can be used as such, or the base can be precipitated with soda. In the latter case the base separates as a brown oil, which solidifies by stirring to a golden-yellow crystalline deposit. The hitherto unknown 2-amino-4-nitrophenoxypropandiol forms, recrystallized from water, golden-yellow crystals, melting at 114° C.; it is easily soluble in alcohol and very difficultly soluble in benzene. It dissolves easily in dilute mineral acids; the solutions thus obtained can be quantitatively diazotized whereby clear diazo solutions are formed.

The working conditions are not limited to those of the above example, but may be varied to a large extent. For instance, the dinitrocompound may be added to the reducing agent or the reaction may be performed in an aqueous alcoholic or a pure alcoholic solution. Further the reduction can also take place at other temperatures and with other polysulphides and other quantities of these agents.

What I claim is:

1. A process for the preparation of 2-amino-4-nitrophenoxypropandiol, consisting in treating 2.4-dinitrophenoxypropandiol with an alkali sulphide as reducing agent.

2. A process for the preparation of 2-amino-4-nitrophenoxypropandiol, consisting in treating 2.4-dinitrophenoxypropandiol with an alkali polysulphide as reducing agent.

3. The herein described 2-amino-4-nitrophenoxypropandiol, obtained by the treatment of 2.4-dinitrophenoxypropandiol with alkali sulphides and constituting an intermediate product for dyestuffs in form of yellow crystals easily soluble in alcohol and very difficultly soluble in benzene, dissolving easily in dilute mineral acids to quantitatively diazotizable solutions.

In witness whereof I have hereunto signed my name this 14th day of October, 1927.

OSCAR KNECHT.